June 19, 1956 P. V. WHITNEY 2,751,094
BUNKER FEEDING SYSTEM
Filed April 15, 1952 2 Sheets-Sheet 2
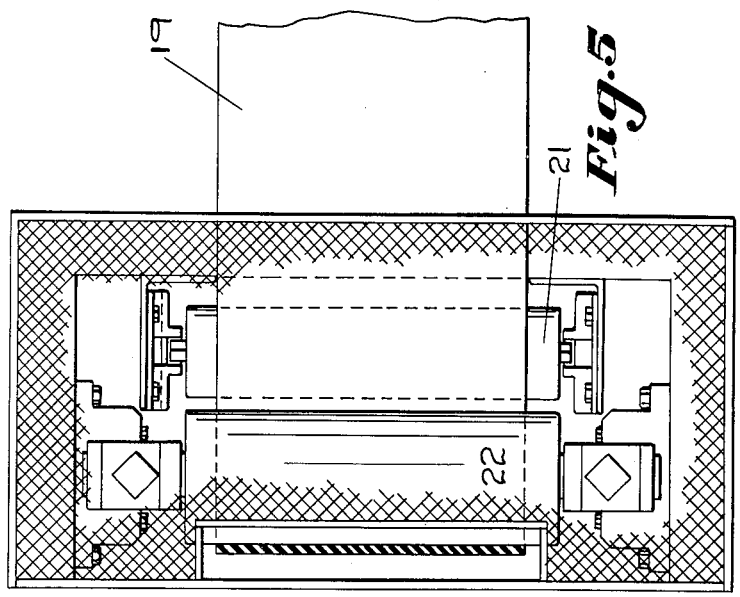
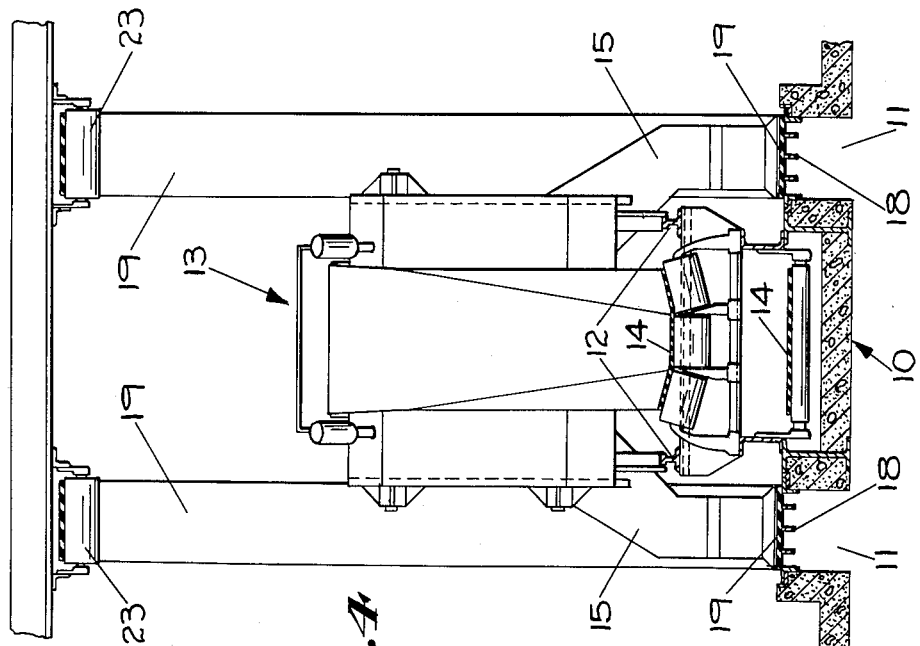
INVENTOR:
PAUL V. WHITNEY,
BY
ATT'Y.

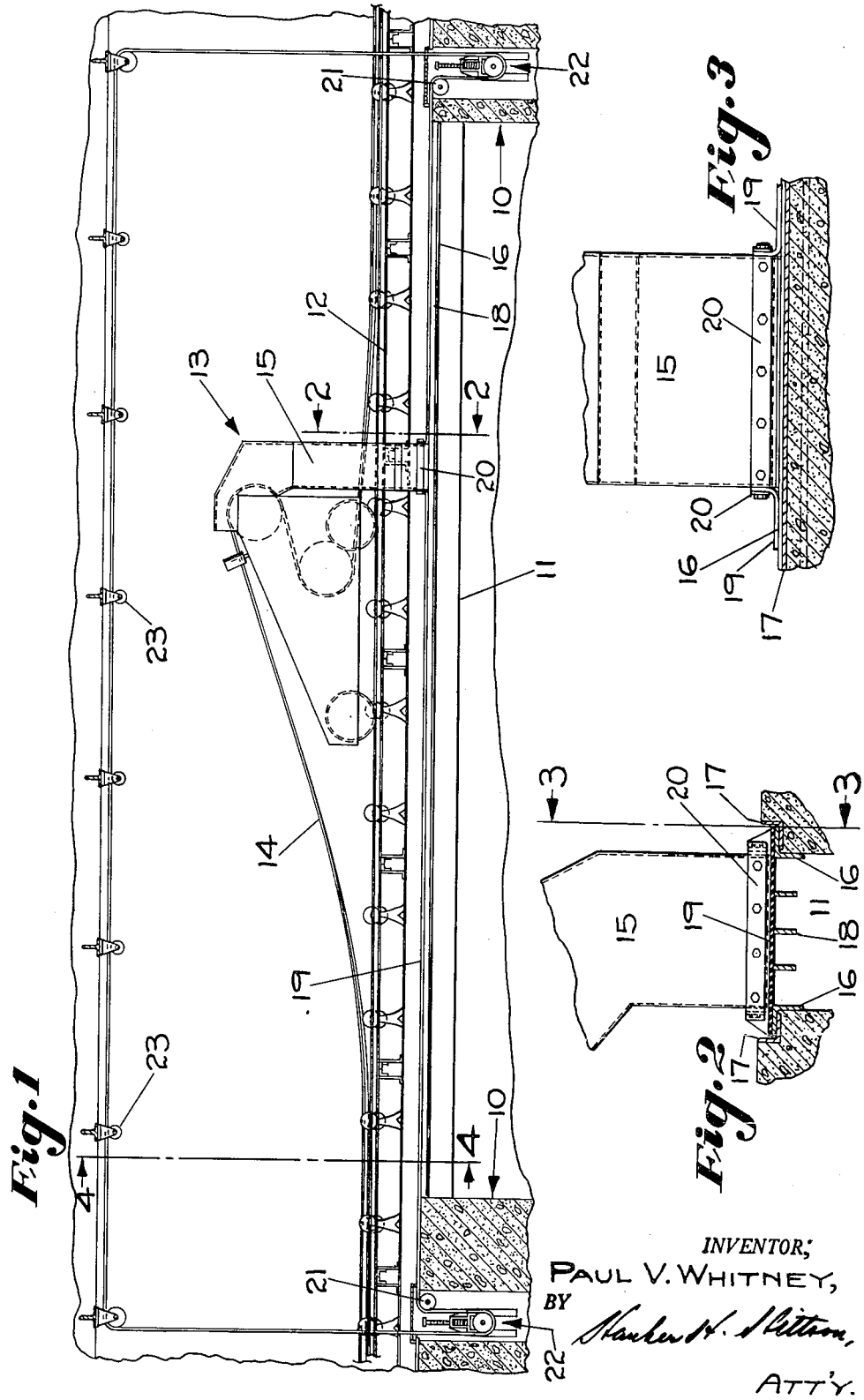

2,751,094
Patented June 19, 1956

2,751,094
BUNKER FEEDING SYSTEM

Paul V. Whitney, Columbus, Ohio, assignor to The Jeffrey Manufacturing Company, a corporation of Ohio Application April 15, 1952, Serial No. 282,393

1 Claim. (Cl. 214—17)

This invention relates to a system for feeding material at various positions along an elongated horizontal feed opening in the top of a bunker, and an object of the invention is to provide improved means for sealing the bunker opening for all positions of an associated bunker filling feed chute in which the sealing means includes an endless belt, the sealing or working run of which lies flat at all times on the elongated feed opening, and opposite ends of which belt are attached to opposite sides of the feed chute.

Other objects of the invention will appear hereinafter, the novel features and combinations being set forth in the appended claim.

In the accompanying drawings:

Fig. 1 is a side elevational view showing particularly the feeding means including a belt tripper and associated feed chutes for feeding material through two parallel horizontal longitudinally extending feed openings on top of a bunker, with which an endless sealing belt is associated with each of the feed openings;

Fig. 2 is a transverse view showing one of the feed chutes and the associated sealing belt, and taken along the line 2—2 of Fig. 1, looking in the direction of the arrows;

Fig. 3 is an elevational view taken along the line 3—3 of Fig. 2, looking in the direction of the arrows;

Fig. 4 is an elevational view taken along the line 4—4 of Fig. 1 of the drawings; and Fig. 5 is a plan view of one of the take-up mechanisms showing the associated sealing belt.

Systems have heretofore been devised for sealing the elongated horizontal feed opening or openings at the top of a storage bunker by means of a sealing belt, but all known systems have certain disadvantages which I have overcome. In one of the better known of these systems the sealing belt is twisted transversely and the feed chute projected thereunder at various positions along the feed opening. This has two disadvantages, the first one being that it is not entirely dust-proof; particularly closely adjacent the chute as it extends under the sealing belt, the other being it tends to wear the sealing belt both because of the transverse bending or distortion and because of the rubbing of the chute against the belt edge.

In another well known form a sealing belt is anchored near opposite ends of a feed opening and it is looped around the feed chute by means of roller guides or the like. The disadvantage of this construction is that a good seal is not effected adjacent the feed chute which often creates a dusty condition as material is fed through the feed opening.

In the construction which I have provided there is no transverse or lateral twisting whatever of the sealing belt and since the two ends of the one-piece belt are attached to opposite sides of the feed chute they can be and are constructed to have a very close fit with adjacent edges of the bunker opening and thus provide a very efficient seal for said opening.

As best illustrated in Figs. 1 and 4 of the drawings, a bunker 10, which may be of poured concrete or the like, is provided with one or more horizontal elongated longitudinally extending feed openings 11 of which there are two disclosed in the illustrated embodiment of my invention. The feed openings 11 are mere duplicates insofar as any significant feature of the invention herein concerned is disclosed and thus a description of one and its associated sealing belt will be applicable to both.

The top of the bunker 10 is provided with a pair of rails 12 supported on an appropriate structure and upon which a belt tripper 13 of standard construction is adapted to travel. The belt tripper 13 carries a load supporting belt 14 which delivers the material to be loaded into the bunker 10 to the tripper 13 which in turn distributes it by way of feed chutes 15 to the feed openings 11. It is obvious that the tripper 13 may be fed longitudinally along the rails 12 and thus deliver the material at any position along the elongated feed openings 11, thereby effecting a desirable distribution of the material within said bunker 10.

As best illustrated in Figs. 1 and 2 of the drawings, the upper edges of the feed openings 11 are preferably formed by angle members 16, one web of each of which is horizontal, the other being vertical and extending downwardly along the side of the adjacent wall of feed opening 11. Each of the horizontal flanges of the angle members 16 are in turn supported by upwardly extending angle members 17 adjacent the top and upper edge of the opening 11.

The top of each opening 11 is also preferably covered by a grate 18 which cooperates with the angle members 16 to support the working or opening covering run of a sealing belt 19, the lateral edges of which overlap the angle members 16 and thus make a good seal therewith. The sealing belt 19 is a one-piece belt, the working run of which extends longitudinally over the opening 11 and opposite ends thereof are attached to the bottom edge of the chute 15 on opposite sides thereof, as clearly illustrated in Figs. 1 and 3 of the drawings. To this end the bottom edge of each chute 15 is provided with a removable metal band 20 preferably bolted to said chute 15 and clamping the opposite ends of the sealing belt 19 in place.

The working or sealing run of the belt 19 is, of course, that portion which extends over and seals the opening 11 from one longitudinal end thereof to the other. Said belt 19 on leaving the opening 11 at either end extends over a guiding roller 21 (see particularly Fig. 5), thence over the roll of a take-up mechanism 22. From the two take-up mechanisms spaced beyond opposite ends of the feed opening 11 the return run of the sealing belt 19 first extends upwardly and then horizontally, as clearly illustrated in Fig. 1 of the drawings. Said return run of the sealing belt 19 between the two take-up mechanisms 22 is supported above the associated chute 15 and preferably above the tripper 13 by idler rolls 23 supported from any desired superstructure.

From the above description it is obvious that the tripper 13 may be fed along the rails 12 so that the feed chutes 15 may discharge at any position throughout the length of their associated feed openings 11. All the while an effective seal is maintained for each of said feed openings 11 by the sealing belt 19 cooperating with the angle members 16 and the chute 15.

It is obvious that the sealing belt 19 is not laterally twisted any place in its working or sealing run, or, for that matter, at any time. It is further obvious that a very complete seal is provided for each of the elongated feed openings 11 at all times.

Obviously those skilled in the art may make various changes in the details and arrangement of parts without departing from the spirit and scope of the invention as defined by the claim hereto appended, and applicant therefore wishes not to be restricted to the precise construction herein disclosed.

Having thus described and shown an embodiment of the invention, what it is desired to secure by Letters Patent of the United States is:

A bunker feeding system comprising an elongated bunker and an elongated bunker feed opening coextensive with the bunker and disposed thereabove, means for delivering material to the bunker including a feed chute above the feed opening for discharging material downwardly into the bunker through the feed opening, means mounting the feed chute for translatory movement in opposite directions from one end of the feed opening to the other end thereof with the discharge end of the feed chute being located closely adjacent the feed opening to avoid the spread of dust as the material is discharged to the bunker, means for closing the feed opening for the full length thereof on opposite sides of the feed chute comprising a flat belt overlying the feed opening and seating on the edges thereof to seal the opening to prevent the escape of dust from the bunker, the ends of the flat belt being fixedly secured to the discharge end of the feed chute on opposite sides thereof and extending therefrom in opposite directions overlying the feed opening, the belt being trained over idlers one at each end of the feed opening, said idlers guiding the belt downwardly, and take-up idlers adjacent the said idlers for maintaining the belt in a substantially taut condition, the belt being trained over the take-up idlers reversing the direction of the belt and guiding it in an upwardly direction, and a series of horizontally aligned idlers over which the belt runs after leaving the take-up idlers.

References Cited in the file of this patent

UNITED STATES PATENTS

| 2,219,226 | Gerber | Oct. 22, 1940 |
| 2,274,825 | Eichenberger | Mar. 3, 1942 |

FOREIGN PATENTS

| 627,563 | Great Britain | Aug. 11, 1949 |